United States Patent [19]
Wyler

[11] Patent Number: 5,310,075
[45] Date of Patent: May 10, 1994

[54] WATERPROOF, GASKETLESS ENCLOSURE

[75] Inventor: Craig S. Wyler, Stark County, Ohio

[73] Assignee: Distribution Control Systems, Inc., Hazelwood, Mo.

[21] Appl. No.: 982,633

[22] Filed: Nov. 27, 1992

[51] Int. Cl.$^5$ ............................................. B65D 43/06
[52] U.S. Cl. ....................................... 220/355; 174/50; 220/731; 361/641
[58] Field of Search ............... 220/306, 327, 354, 355, 220/731; 361/356, 246; 174/50

[56] References Cited

U.S. PATENT DOCUMENTS

| | | | |
|---|---|---|---|
| 3,307,603 | 3/1967 | Swett | 220/355 X |
| 3,467,929 | 9/1969 | Derbyshire et al. | 336/61 |
| 3,912,348 | 10/1975 | Seymour | 312/100 |
| 4,291,817 | 9/1981 | Spitzer et al. | 220/327 |
| 4,623,753 | 11/1986 | Feldman et al. | 174/50 |
| 4,654,470 | 3/1987 | Feldman et al. | 174/50 |
| 4,675,782 | 6/1987 | Hibbert et al. | 361/356 |
| 4,699,292 | 10/1987 | Farrell | 220/378 X |
| 4,805,073 | 2/1989 | Johnson et al. | 361/246 |
| 4,850,014 | 7/1989 | Gillis et al. | 361/356 X |
| 4,973,797 | 11/1990 | Jorgensen et al. | 174/53 |
| 5,048,715 | 9/1991 | Wolff | 220/306 X |
| 5,097,977 | 3/1992 | Straub | 220/306 X |

FOREIGN PATENT DOCUMENTS 950842 7/1974 Canada ................. 220/355

OTHER PUBLICATIONS

Steven Feldman, Surface Tension Provides Raintight Seal, Oct. 1985.

Primary Examiner—Allan N. Shoap
Assistant Examiner—Christopher T. McDonald
Attorney, Agent, or Firm—Polster, Lieder, Woodruff & Lucchesi

[57] ABSTRACT

A gasketless enclosure (10) for housing outdoor electrical equipment. The enclosure includes a box (12) having a base (14) and upwardly extending, sidewalls (16A-16D). The walls define an open, upper face, over which fits a cover (18). A closure mechanism (28) includes an upwardly projecting lip (30) formed at the upper end of the sidewalls and extending around the circumference of the box, and a channel (32) formed in the abutting face (34) of the cover and sized to receive the lip. To help prevent moisture from seeping into the interior of the box and harming the equipment housed therein, gutters (42, 44) are formed in the abutting surfaces of the box and the cover. The gutter (44) formed in the box is formed outwardly of the lip, and the gutter (46) formed in the cover is formed outwardly of the channel. The gutter in the cover sits over the gutter in the box when the cover is in place. The gutter formed along the top and sides of the box is open at the bottom of the enclosure, providing a drain (45) for directing moisture collecting in the gutters to the outside of the box.

19 Claims, 2 Drawing Sheets

WATERPROOF, GASKETLESS ENCLOSURE

BACKGROUND OF THE INVENTION

This invention relates to outdoor enclosures for electrical equipment and the like, and more particularly, to a waterproof, gasketless cover.

Electrical equipment such as transformers, relays, etc. which are used outdoors must be protected from rain, sleet, hail, or snow. This is not only to prevent them from shorting out, for example when it rains, but also to increase their life which would otherwise by shortened by constant exposure to the elements, ultraviolet and solar radiation, and so forth. Accordingly, there have long been protective enclosures in which this type of equipment has been housed. And, the enclosures must be accessed for service, repair, or replacement of the equipment. To protect the insides from moisture, the door or other closure had a sealing gasket for effecting a watertight or moisture proof seal when the door was closed. Of course, the gasket was subject to wear as well as being exposed to the elements and, over time, could fail. Once it had failed, the equipment was again subject to the environment. Separate and apart from this problem, gaskets are typically costly and increase the price of the enclosure.

There have been gasketless enclosures for use in housing this equipment. In general, if the electrical equipment is used in relatively benign environments; i.e., the primary exposure is to rain, the enclosure might only have a simple tongue and groove arrangement at the mating surfaces of a base and lid. The basic idea in these constructions is to create such a torturous path that water cannot travel it. If, however, the equipment is subjected to more severe environments, more complex constructions have been used to provide the requisite degree of protection. See, for example, U.S. Pat. Nos. 4,973,797; 4,805,073; 4,675,782; 4,654,470; 4,623,753; 4,291,817; 3,912,348; and 3,467,929. Also see Surface Tension Provides Raintight Seal by Steven Feldman, prepared for the 18th IEEE Photovoltaic Specialist Conference, 1985. While the various enclosures described in these publications may produce the desired result, they tend to be more complicated, and therefore costly, than may be necessary.

SUMMARY OF THE INVENTION

Among the several objects of the present invention may be noted the provision of an enclosure for housing electrical equipment which is used outdoors; the provision of such an enclosure which is a gasketless enclosure but which still provides a waterproof seal to protect the equipment housed therein; the provision of such an enclosure to be of a ploymeric material which can stand prolonged exposure to the weather without deteriorating; the provision of such an enclosure to satisfy both the National Electrical Machinery Association (NEMA) and Underwriter's Laboratories (UL) guidelines or standards for such enclosures; the provision of such an enclosure to have a self-aligning cover and base to readily effect the seal when the cover is closed in place; the provision of such an enclosure which is available in various sizes and shapes to accommodate different pieces of electrical equipment and which is usable in severe environments and yet protects the equipment from damage; the provision of such an enclosure to be of a simple yet effective design; and, the provision of such an enclosure which is low in cost and easy to manufacture and assemble.

In accordance with the invention, generally stated, a gasketless enclosure houses outdoor electrical equipment. The enclosure includes a box having a base and upwardly extending, sidewalls. The walls define an open, upper face, over which fits a cover. A closure mechanism includes an upwardly projecting lip formed at the upper end of the sidewalls and extending around the circumference of the box, and a channel formed in the abutting face of the cover and sized to receive the lip. To help prevent moisture from seeping into the interior of the box and harming the equipment housed therein, gutters are formed along the top and sides of the abutting surfaces of the box and the cover. The gutter formed in the box is formed outwardly of the lip, and the gutter formed in the cover is formed outwardly of the channel. The gutter in the cover sits over the gutter in the box when the cover is in place. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
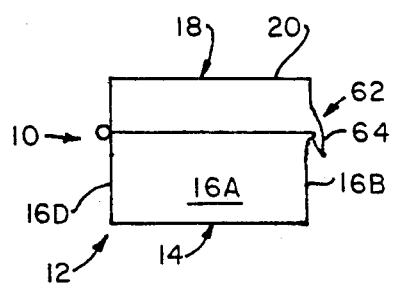
FIG. 1 is a side elevational view of an enclosure of the present invention.
Figure 4B:
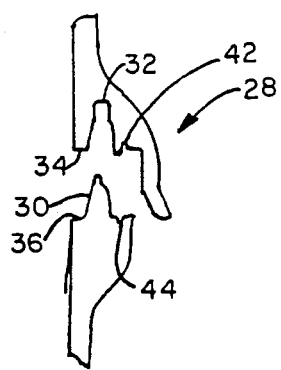
FIGS. 4A and 4B are respective sectional views of the closure mechanism with the box closed and open; and, FIG. 5 is an enlarged sectional view similar to FIG. 4A and better illustrating the gutter construction to prevent moisture seepage into the box.
Figure 4A:
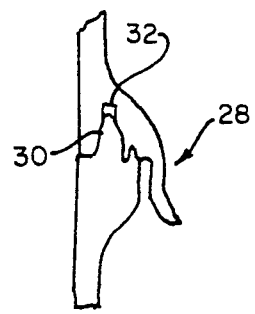

Referring to the drawings, a waterproof, gasketless enclosure 10 is shown in FIG. 1. The enclosure is for housing electrical equipment which is used out of doors and is therefore subject to a variety of atmospheric conditions, but especially moisture in the form of rain, sleet, snow or fog. The purpose of enclosure 10 is to prevent moisture from getting at the equipment and causing an electrical short circuit, damage to wiring or connectors, or similar problems.

Figure 2:
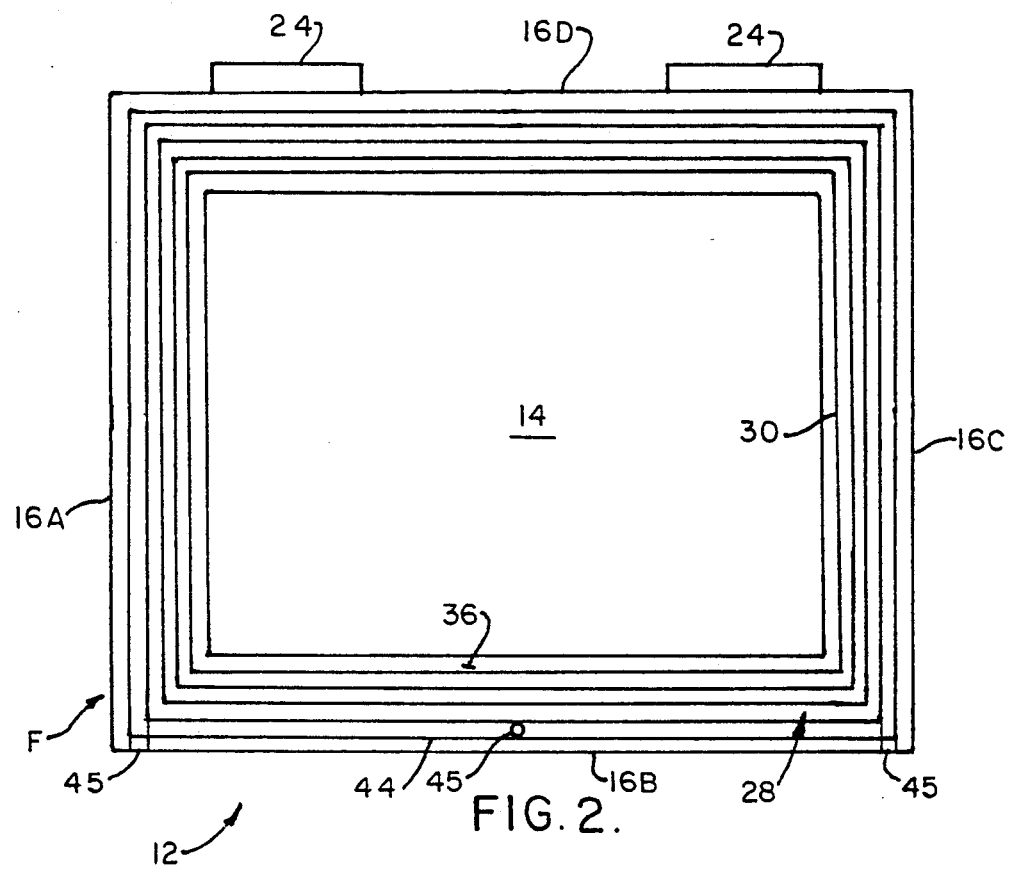
FIG. 2 is a top plan view of the box portion of the enclosure.

Referring to FIG. 2, enclosure 10 first includes a box 12 having a base or bottom 14, and respective sidewalls 16A-16D. The sidewalls extend upwardly from base 14, and at their upper end define an open, upper face F of the box. While shown to be of rectangular construction in FIG. 2, it will be understood that the box can be square or even of another polygonal shape without effecting the scope of the invention. The actual size and shape of the box is such that it is sized to receive an item of equipment to be housed therein.

Figure 3:
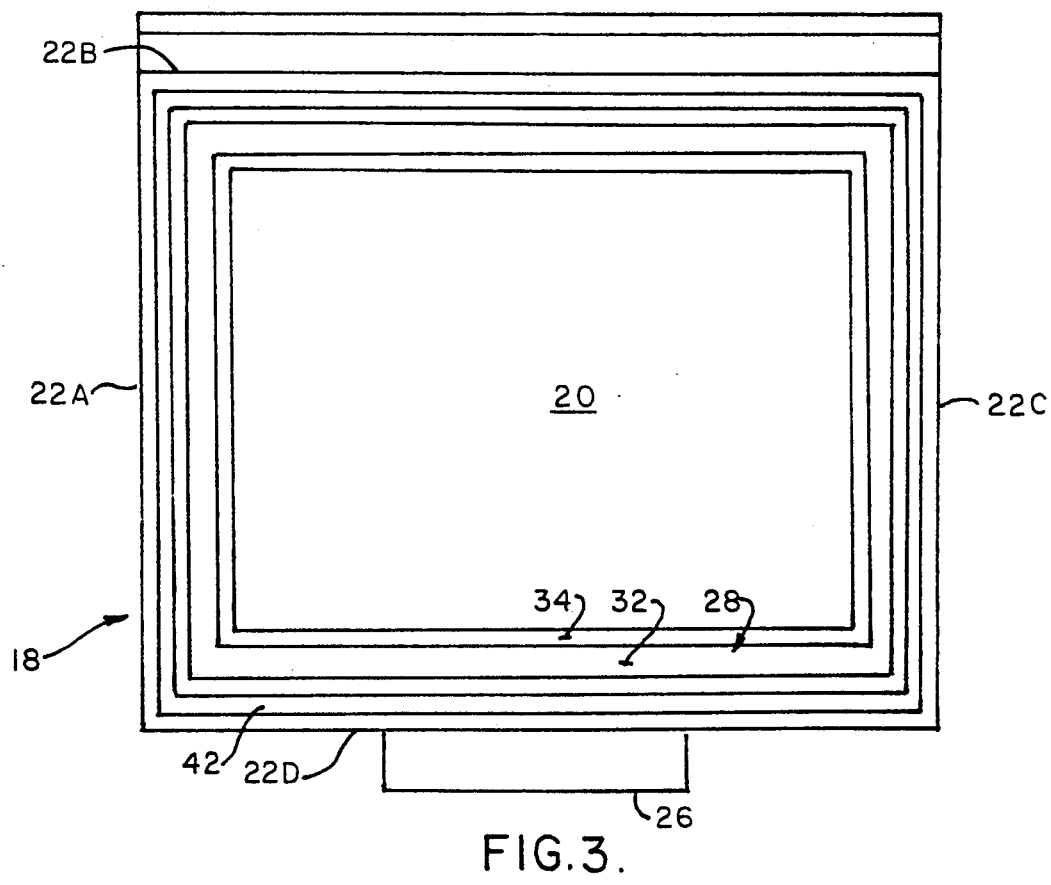
FIG. 3 is a bottom plan view of a cover for the box.

A cover, indicated generally 18 in FIGS. 1 and 3 fits over the open face of box 12 to enclose the piece of electrical equipment in the box. The cover has a lid 20 and sidewalls 22A-22D respectively. Preferably, the cover is hinged to the box for easier, self aligned opening and closing, and for this purpose, respective hinge pieces 24 and 26 are mounted on sidewall 16D and 22D. Both the box and the cover are formed of a polymeric material.

Figure 5:
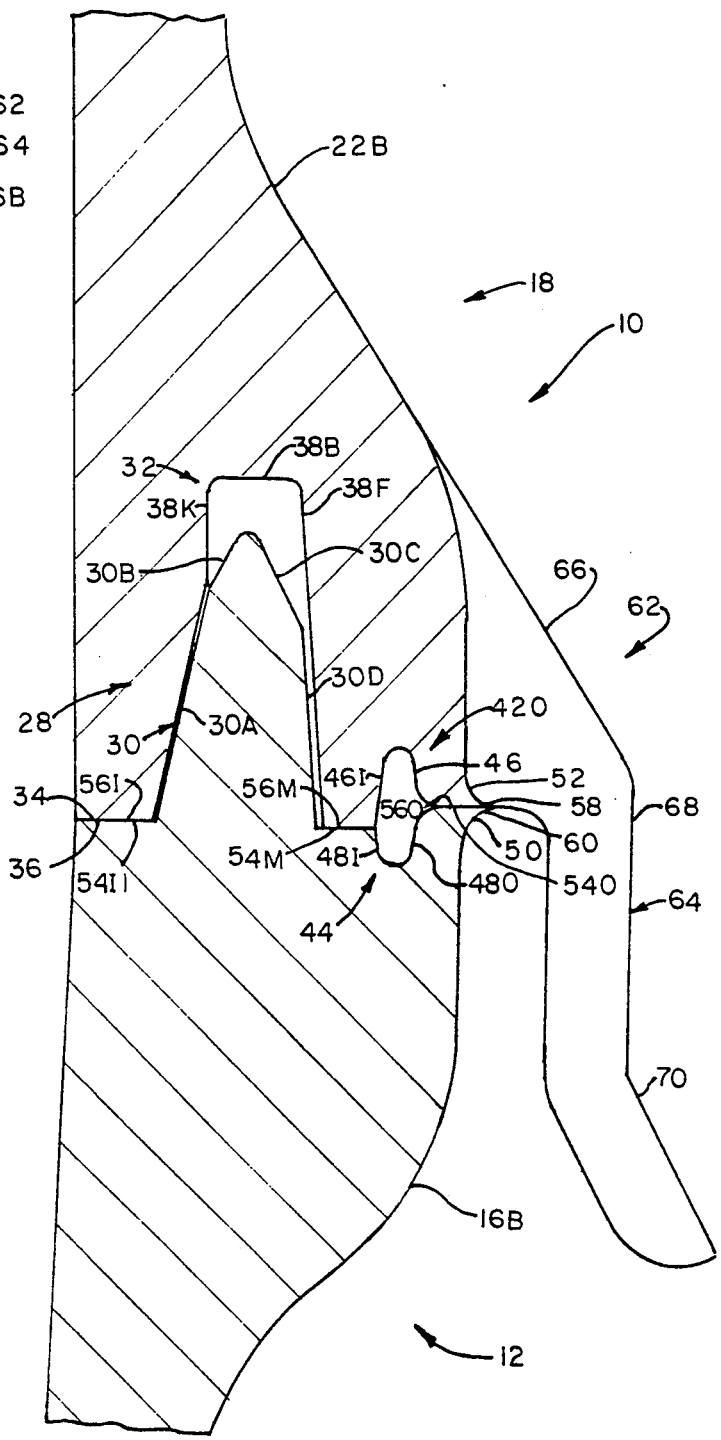

A closure means 28 is formed on the box and the cover and includes elements cooperating with each other to close the cover over the box and hold it in place. As shown in FIGS. 2, 4A, 4B and 5, the closure means includes an upwardly projecting lip 30 formed in the upper end of the sidewalls and extending around the circumference of box 12. It further includes a channel 32 formed in the surface 34 of the cover which fits over the upper end of sidewalls 16 and abuts with surface 36 to close the box. As best shown in FIG. 5, lip 30 has a sloping rear face 30A which flattens slightly into an upper sloping surface 30B. The top of the lip, which is narrower than the base, is rounded. On the front side of the lip is a sloping surface 30C which has approximately the same degree of slope as surface 30B but which extends farther down the lip. The surface then transitions into a steeply sloping front face 30D. Channel 32 extends around the circumference cover face 34. The channel is located directly above lip 30 when the cover is in place, and is sized so that the body of the lip is received in the channel when the cover is fitted over the box. Channel 32 has front and rear walls 38F and 38K which extend deeper into the cover than the height of the lip. Wall 38K is generally contoured to match the sloping face 30A of the lip, while face 38F has a slope generally corresponding to that of face 30D. The channel also has a base wall 38B which is sufficiently wide to accommodate the upper end of the lip. When cover 18 is closed over the box, there is a small clearance between the rear surface of the lip and the rear wall of the channel, and a slightly larger clearance between the front surface of the lip and the front wall of the channel.

Besides providing a closure mechanism for the box and cover, the lid and channel also help make the enclosure waterproof. It does this by providing a barrier around which it is difficult for water travel. Enclosure 10 also includes a gutter means 40 formed on the box and cover for further helping prevent moisture from seeping into the interior of the box and harming the equipment housed therein. Means 40 includes respective gutters 42 and 44 formed in the respective abutting surfaces 34 and 36 of the cover and box. Gutter 44 on box 12 is formed outwardly of lip 30; while gutter 42 of cover 18 is formed outwardly of channel 32. As seen in FIG. 5, gutter 42 sits over gutter 44 when cover 18 is in place. As also shown in FIG. 5, gutter 44 is shallower than gutter 42. Gutters 42 and 44 together drain at the bottom of the enclosure.

Each gutter has an inner wall and an outer wall, gutter 42 having respective inner and outer walls 46I and 46O, and gutter 44 respective inner and outer walls 48I and 48O. The outer portion of the box sidewall 16B curves outwardly at its upper end as does the lower portion of cover sidewall 22B. In addition, outer edge 50 of sidewall 16B extends above the rest of surface 36, and outer edge 52 of sidewall 22B is correspondingly shorter. As a consequence, outer wall 48O of gutter 44 extends higher than the inner wall of the gutter. And, outer wall 46O of gutter 42 is shorter than the inner wall of the gutter.

Both of the abutting surfaces 34, 36 have flat portions which fit against each other when the cover is closed on the box. Surface 36 has an inner flat portion 54I formed on the inside of lip 30, an intermediate flat portion 54M formed between the outside of the lip and inner wall 48I of gutter 44, and an outer flat surface 54O formed between outer wall 48O of the gutter and outer edge 50 of sidewall 16B. Surface 34 has corresponding inner, intermediate, and outer flat portions 56I, 56M, and 56O. Because of the raised outer edge of sidewall 16B, the inner and intermediate flat portions 54I and 54M of surface 36 are level with each other, but outer flat portion 54O is raised with respect thereto. Similarly, the inner and intermediate flat portions 56I and 56M of surface 34 are level with each other, and outer flat portion 56O is lower with respect thereto. The amount by which it is lower is the same amount by which flat 54O is raised.

It will be understood that while the above construction of lip 30, channel 32, gutters 42 and 44 and the associated configuration of abutting surfaces 34, 36 are described with respect to respective sidewalls 16B and 22B of the box and cover, the construction may be same for each of the other sides of the box and cover. The importance of this construction is that it eliminates the capillary action of water which occurs at two mating surfaces and thus prevents moisture from getting into the enclosed portion of the box. To further improve the moisture resistance of the enclosure, lips 58 and 60 are respectively formed at the outer edges of surfaces 34, and 36 to direct water away from the abutting surfaces Further, a water guard means 62 is formed on the outer face of cover 18. Means 62 comprises a splash guard 64 which extends outwardly of the cover and down below closure point between the box and cover. As seen in FIG. 5, guard 64 has an upper outwardly and downwardly sloping section 66, an intermediate and generally vertical section 68, and a lower downwardly and outwardly sloping section 70. Sections 68 and 70 are spaced away from the sidewall of box 23. This provides room for someone wanting to open the box to have room to grasp the cover and lift it. Again, guard 64 may be formed on each side of the cover or along side 22B only.

What has been described is a gasketless enclosure for housing electrical equipment which is used outdoors. By being gasketless, the cost of gasket materials and adhesives for attaching the gasket, as well as the labor cost involved is eliminated. Both the box and the cover can be molded with an appropriate polymer material which will not deteriorate after prolonged outdoor usage and which provides a rugged enclosure for protecting electrical equipment housed. Importantly, the enclosure, although gasketless, still provides a waterproof seal to protect the equipment. To protect the integrity of the enclosure from moisture, splash guard 64 first acts to direct rain, for example, from directly striking at the juncture between the cover and box. Next, the outwardly turned lips and radiused protrusions of the cover and box near their edges directs water away from their juncture. Third, gutters 42 and 44 collect any moisture which may enter the enclosure and drain it away to the outside. Finally, the lip 30, channel 32 configuration provides a barrier for the moisture. The enclosure design is such that it satisfies both NEMA and UL guidelines and standards for electrical equipment enclosures.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A waterproof, gasketless enclosure for housing electrical equipment which is used out of doors and is therefore subject to a variety of atmospheric conditions, comprising:
   a box having a base, sidewalls extending upwardly from the base, and an open, upper face defined by the sidewalls, the box being sized to receive an item of equipment to be housed therein;
   a cover fitting over the open face of the box to enclose the item in the box;
   closure means formed on the box and the cover and cooperating with each other to close the cover over the box and hold the cover in place; and,
   gutter means formed on the box and cover for preventing moisture from seeping into the interior of the box and harming the equipment, wherein the closure means includes a lip and a channel for receiving the lip respectively formed on abutting surfaces of the box and the cover when the cover is placed over the box, and the gutter means includes respective gutters formed in the respective abutting surfaces.

2. The enclosure of claim 1 wherein the closure means includes an upwardly projecting lip formed at the upper end of the sidewalls and extending around the circumference of the box.

3. The enclosure of claim 2 wherein the closure means further includes a channel formed in the face of the cover fitting over the upper end of the sidewalls to close the box, the channel extending around the circumference of the face, and the channel being so located on the face of the cover, and so sized that the lip is received in the channel when the cover is fitted over the box.

4. The enclosure of claim 3 wherein the gutter in the box is formed outwardly of the lip and the gutter in the cover is formed outwardly of the channel, and the cover gutter sits over the box gutter when the cover is in place.

5. The enclosure of claim 4 wherein the box gutter has a drain opening to the outside of the bottom of the enclosure for moisture entering the gutter to drain to the outside of the enclosure.

6. The enclosure of claim 4 wherein each gutter has an inner wall and an outer wall, the outer wall of the box gutter extending higher than the inner wall thereof, and the outer wall of the cover gutter being shorter than the inner wall thereof.

7. The enclosure of claim 6 wherein the abutting surface of the box has an inner flat portion formed inside the lip, and intermediate flat portion formed between the outside of the lip and the inner wall of the box gutter, and an outer flat surface formed outside the outer wall of the box gutter.

8. The enclosure of claim 7 wherein the abutting surface of the cover has corresponding inner, intermediate, and outer flat portions formed thereon.

9. The enclosure of claim 8 wherein the inner flat and intermediate flat portions of the abutting surface of the box are level with each other, and the outer flat portion is raised with respect thereto.

10. The enclosure of claim 9 wherein the inner flat and intermediate flat portions of the abutting surface of the cover are level with each other, and the outer flat portion is lowered with respect thereto, the outer flat portion being lowered by the same amount the outer flat portion of the abutting surface of the box is raised.

11. The enclosure of claim 1 further including guard means formed on the cover and extending outwardly of the cover over the sidewalls of the box, when the cover is in place for further preventing moisture from getting into the box.

12. A waterproof, gasketless enclosure for housing outdoor electrical equipment comprising:
   a box having a base, sidewalls extending upwardly from the base, and an open, upper face defined by the sidewalls, the box being sized to receive an item of equipment to be housed therein;
   a cover fitting over the open face of the box to enclose the item in the box, the sides of the cover and the sidewalls of the box both having outwardly radiused sections adjacent their abutting surfaces for directing moisture away from their juncture, and the edges of the abutting surfaces further having lips to further direct moisture away from the juncture;
   gutter means formed on the box and cover for preventing moisture from seeping into the interior of the box and harming the equipment, said gutter means comprising respective gutters formed in the abutting surfaces of the box and the cover, and including a drain opening at the bottom of each side to the outside of the enclosure for moisture entering the gutter to drain to the outside of the enclosure;
   an upwardly projecting lip formed at the upper end of the sidewalls and extending around the circumference of the box; and,
   a channel formed in the face of the cover fitting over the box and extending around the circumference of the face, the channel being sized to receive the lip when the cover is installed, the lip and channel effecting both a closure between the box and the cover and a barrier to moisture trying to flow into the interior of the enclosure.

13. The enclosure of claim 12 wherein the gutter formed in the box is formed outwardly of the lip and the gutter formed in the cover is formed outwardly of the channel, with the gutter in the cover sitting over the gutter in the box when the cover is in place.

14. The enclosure of claim 13 wherein each gutter has an inner wall and an outer wall, the outer wall of the gutter in the box extending higher than the inner wall thereof, and the outer wall of the gutter in the cover being lower than the inner wall thereof, and the gutter in the box being shorter than the gutter in the cover.

15. The enclosure of claim 14 wherein the abutting surfaces of both the box and the cover have inner flat portions respectively formed inside the lip and the channel, intermediate flat portions respectively formed to the outside of the lip and the channel, said intermediate flat portions both being to the inside of the respective gutters, and an outer flat portion respectively formed outside respective gutters, the inner flat portion and intermediate flat portion of the abutting surface of the box and the inner flat portion and intermediate flat portions of the abutting surface of the cover being respectively level with each other, and with the outer flat portion of the abutting surface of the box being raised with respect to the other flat portions thereof, and the outer flat portion of the abutting surface of the box being raised with respect to the other flat portions thereof, and the outer flat portion of the abutting surface of the cover being correspondingly lowered.

16. The enclosure of claim 12 further including guard means formed on the cover and extending outwardly of the cover over the sidewalls of the box, when the cover is in place for further preventing moisture from getting into the box.

17. In a gasketless enclosure for housing outdoor electrical equipment, the enclosure including a box having a base and upwardly extending, sidewalls which define an open, upper face, a cover fitting over the open face of the box to enclose an item housed therein, and closure means including an upwardly projecting lip formed at the upper end of the sidewalls and extending around the circumference of the box, and a channel sized to receive the lip formed on the box and cover for preventing moisture from seeping into the interior of the box and including respective gutters formed in the abutting surfaces of the box and the cover with the gutter formed in the box being formed outwardly of the lip and the gutter formed in the cover being formed outwardly of the channel, the gutter in the cover sitting over the gutter in the box when the cover is in place, and the gutter in the box having a drain opening at the bottom of either side to the outside of the enclosure for moisture entering the gutters to drain to the outside of the enclosure.

18. The improvement of claim 17, further including guard means formed on the cover and extending outwardly of the cover over the sidewalls of the box, when the cover is in place to further prevent moisture from getting into the box.

19. The improvement of claim 18 wherein the cover is hingedly attached to the base.

* * * * *